United States Patent
Cox

(10) Patent No.: US 10,940,941 B2
(45) Date of Patent: Mar. 9, 2021

(54) METHOD FOR INCREASING AIRCRAFT EFFECTIVE VALUE

(71) Applicant: Borealis Technical Limited, North Plains, OR (US)

(72) Inventor: Joseph J. Cox, Portland, OR (US)

(73) Assignee: Borealis Technical Limited, Isle of Man (IM)

( * ) Notice: Subject to any disclaimer, the term of this patent is extended or adjusted under 35 U.S.C. 154(b) by 128 days.

(21) Appl. No.: 14/559,930

(22) Filed: Dec. 4, 2014

(65) Prior Publication Data

US 2016/0159470 A1 Jun. 9, 2016

(51) Int. Cl.
*B64C 25/40* (2006.01)

(52) U.S. Cl.
CPC ............. *B64C 25/405* (2013.01); *Y02T 50/80* (2013.01)

(58) Field of Classification Search
CPC ....... B64C 25/32; B64C 25/34; B64C 25/345; B64C 25/36; B64C 25/405; Y10T 29/49716; B64F 1/305
See application file for complete search history.

(56) References Cited

U.S. PATENT DOCUMENTS

| | | | | |
|---|---|---|---|---|
| 3,279,722 A | * | 10/1966 | Glover, Jr. | ................. B64F 1/22 244/17.17 |
| 3,524,207 A | * | 8/1970 | Giarretto | .................... B64F 1/00 14/71.5 |
| 3,711,043 A | * | 1/1973 | Cameron-Johnson | ....................... B64C 25/36 180/55 |
| 5,214,973 A | * | 6/1993 | Hambric | .................. F16H 15/12 476/68 |
| 6,487,743 B1 | * | 12/2002 | Nicoletti | .................. B64F 1/305 14/71.3 |
| 6,657,334 B1 | | 12/2003 | Edelson | |
| 6,684,443 B2 | * | 2/2004 | Thomas | .................. B64F 1/305 14/69.5 |
| 6,838,791 B2 | | 1/2005 | Edelson | |
| 7,116,019 B2 | | 10/2006 | Edelson | |

(Continued)

FOREIGN PATENT DOCUMENTS

| | | | | |
|---|---|---|---|---|
| WO | WO 2012071456 A2 | * | 5/2012 | ........... B64C 25/405 |
| WO | WO 2012106643 A1 | * | 8/2012 | ........... B64C 25/405 |
| WO | WO 2013173816 A2 | * | 11/2013 | ........... B64C 25/405 |

OTHER PUBLICATIONS

KPMG, "Components of Aircraft Acquisition Cost", www.kpmg.conn/Global/en/IssuesAndInsights/ArticlesPublications/Documents/components-of-aircraft-acquisition.pdf, May 2007, Australia.

*Primary Examiner* — Jacob J Cigna

(57) ABSTRACT

A method for increasing the effective value and extending the economic life of aircraft is provided. When older or new aircraft are enabled and controlled to move autonomously on the ground without reliance on aircraft engines or external tow vehicles by equipping the aircraft with cost-saving wheel drive systems controllable to move the aircraft autonomously on the ground, substantial reductions in aircraft operating costs can be realized, and the value of aging airline fleets, as well as new aircraft, can be increased significantly. Unexpected reductions in aircraft effective economic age and increases in value can be achieved, particularly when aircraft equipped with cost-saving wheel drive systems experience large numbers of short flights and a large amount of taxi time.

6 Claims, 5 Drawing Sheets

(56) References Cited

U.S. PATENT DOCUMENTS

| | | | |
|---|---|---|---|
| 7,469,858 B2 | 12/2008 | Edelson | |
| 7,793,884 B2* | 9/2010 | Dizdarevic | B64C 1/0009 244/117 R |
| 8,474,748 B2* | 7/2013 | Cros | B64C 25/405 244/103 S |
| 9,022,316 B2* | 5/2015 | Gilleran | B64C 25/405 244/103 R |
| 9,169,005 B2* | 10/2015 | Oswald | B64C 25/405 |
| 9,193,449 B2* | 11/2015 | Cox | B64C 25/405 |
| 9,211,948 B2* | 12/2015 | Osman | B64C 25/405 |
| 9,233,752 B2* | 1/2016 | Walitzki | B64C 25/405 |
| 9,280,155 B2* | 3/2016 | Cox | G05D 1/0083 |
| 2002/0104176 A1* | 8/2002 | Thomas | B64F 1/305 14/71.5 |
| 2006/0273686 A1 | 12/2006 | Edelson et al. | |
| 2009/0114765 A1* | 5/2009 | Cox | B64C 25/40 244/50 |
| 2009/0261197 A1* | 10/2009 | Cox | B64C 25/36 244/50 |
| 2010/0163670 A1* | 7/2010 | Dizdarevic | B64C 1/0009 244/36 |
| 2011/0297786 A1* | 12/2011 | Sweet | B64C 25/405 244/103 R |
| 2012/0217339 A1* | 8/2012 | Gilleran | B64C 25/405 244/50 |
| 2013/0112806 A1* | 5/2013 | Walitzki | B64C 25/405 244/50 |
| 2013/0138584 A1* | 5/2013 | Vana | G06Q 90/00 705/500 |
| 2013/0200210 A1* | 8/2013 | Oswald | B64C 25/405 244/50 |
| 2014/0138478 A1* | 5/2014 | Cox | B64C 25/405 244/50 |
| 2014/0336847 A1* | 11/2014 | Cox | B64C 25/405 701/3 |
| 2015/0008286 A1* | 1/2015 | Cox | B64F 1/30 244/137.2 |
| 2015/0151853 A1* | 6/2015 | Cox | B64C 25/405 701/3 |
| 2015/0175275 A2* | 6/2015 | Cox | B64F 1/30 244/137.2 |
| 2015/0210383 A1* | 7/2015 | De Mers | B64C 25/405 244/50 |
| 2015/0253773 A1* | 9/2015 | Cox | G05D 1/0083 701/3 |
| 2016/0009383 A1* | 1/2016 | Oswald | B64C 25/405 244/50 |
| 2016/0016659 A1* | 1/2016 | Cox | B64C 25/405 244/50 |
| 2016/0025624 A1* | 1/2016 | Mucci | G01N 21/3577 250/339.07 |
| 2016/0096618 A1* | 4/2016 | Nicolas | B64C 25/405 244/50 |
| 2016/0096620 A1* | 4/2016 | Kracke | B64C 25/10 244/50 |
| 2016/0101847 A1* | 4/2016 | Hawksworth | B64C 25/34 244/103 R |
| 2016/0122008 A1 | 5/2016 | Cox et al. | |
| 2016/0159470 A1* | 6/2016 | Cox | B64C 25/405 29/401.1 |

* cited by examiner

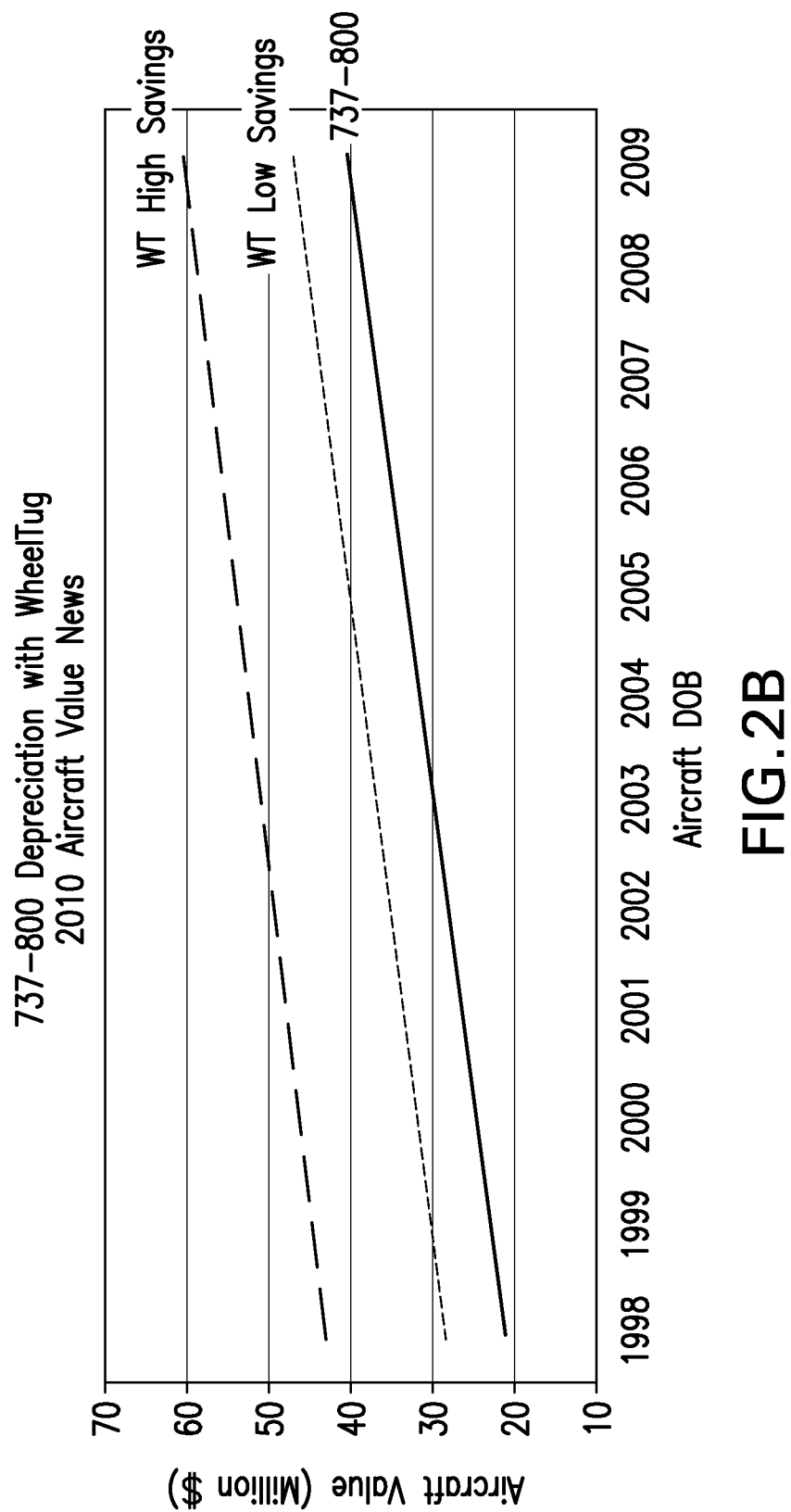

METHOD FOR INCREASING AIRCRAFT EFFECTIVE VALUE

TECHNICAL FIELD

The present invention relates generally to increasing the value of a large depreciable asset, such as an aircraft, and specifically to a method for significantly increasing aircraft effective value while concurrently reducing airline operating costs.

BACKGROUND OF THE INVENTION

The airline industry has undergone challenges in recent years as it has attempted to maintain acceptable service levels while operating profitably. The industry has experienced major losses, and a number of major airlines have been involved in bankruptcy or bankruptcy protection. The secondary aircraft market and the valuation of aircraft assets in financial statements have reflected these challenges. Aircraft and aircraft-related assets are costly, and their acquisition, whether by lease or purchase, represents the single most important investment an airline will make. Aircraft-related assets can include a number of different components, such as the airframe, engines, and certain modifications to the aircraft. If an airline is to maximize the use of its aircraft and aircraft-related assets, they must be maintained at a level that meets the requirements of national and/or international regulatory authorities, which can be a costly process. In the current economic climate, such costs are required to extend the useful life and value of aircraft and aircraft-related assets and keep airlines operating profitably. This industry is highly capital intensive, and achieving an acceptable return on capital requires constant attention.

The useful life and value of an aircraft can be affected by many factors and are often difficult to predict. The decision to "retire" an aircraft can also be based on many considerations. Changes in technology, business cycles, fuel prices, noise and/or fuel emissions requirements, and the economy, for example, can impact an aircraft's value or effective service life. Although the earliest generation of jet aircraft had relatively short useful lives in the range of 10 to 20 years or even less, today's aircraft are in service significantly longer. Some studies show 30 to 35 years to be the median length of service before an aircraft is retired. Some groups of aircraft, the DC-8 freighters in particular, tend to have unusually long effective lives, and many are still in operation after 40 years.

The economic and financial environment of the past several years has led airlines to postpone the acquisition of new aircraft, although this appears to be changing in view of very large orders placed recently for new aircraft to be delivered in the 2015 to 2025 time horizon. This is likely to limit the availability of new aircraft to those airlines that did not place orders. Currently, the average age of many, if not most, airlines' fleets of aircraft has increased and is likely to continue to do so for at least the next several years. Low cost passenger and cargo carriers, in the United States and elsewhere, have tended to purchase used aircraft, with the result that older aircraft are kept operating longer than would have been the case in the not too distant past. It has been estimated by the International Air Transport Association (IATA) that about 35% of United States airlines' aircraft are more than 25 years old. Other reports have documented a steady increase in the average age of aircraft operated by U.S. airlines. Airlines are currently under pressure to maximize the value and operation of their existing fleets while reducing the costs of flying. Additional pressures are being applied on airlines to increase fuel efficiency, reduce greenhouse gas emissions, and generally minimize the impact of aircraft on air quality and climate change, which adds additional costs. To meet these challenges in the current economic environment where it could prove difficult to fund the new replacement aircraft ordered or optioned, airlines continue to look for possible ways to extend the useful economic lives and increase the residual value of their aging aircraft.

It was reported by KPMG that the useful lives and residual values of existing aircraft fleets are adversely affected by the availability of "new generation" aircraft with reduced operating costs. (www.kpmg.com/Global/en/IssuesAndInsights/ArticlesPublications/Documents/components-of-aircraft-acquisition.pdf) Further, the carrying value of the older aircraft may impact an airline's profit or loss. The decision to retire an aircraft early can also affect the depreciation of this critical airline asset. If, as the KPMG report noted, an aircraft or airline asset is not retained throughout its entire economic life, the residual value of the aircraft may be an important part of an airline's depreciation policy. Effects on aircraft residual value can include such factors as the average length of flights, the number of cycles an aircraft has flown, maintenance costs, and prices of used and replacement aircraft.

A need exists, therefore, for a method for extending aircraft effective value throughout the useful economic life of an aircraft, whether the aircraft is new or old. Increasing aircraft effective value, particularly toward the end of an aircraft's life makes the operation of older aircraft cost-effective.

SUMMARY OF THE INVENTION

It is a primary object of the present invention, therefore, to provide a method for extending the effective value and the useful economic life of both old and new aircraft.

It is another object of the present invention to provide a method for increasing aircraft effective value in connection with equipping an aircraft with a cost-saving onboard wheel drive system controllable to move the aircraft on the ground without reliance on the aircraft's main engines or external tow vehicles.

It is an additional object of the present invention to provide a method for increasing the value of airline aircraft assets.

It is a further object of the present invention to provide a method for achieving significant value increase in an aircraft with a taxi profile that includes a large number of short flights and a large amount of taxi time.

It is yet another object of the present invention to provide a method for extending aircraft economic value toward the end of an aircraft's useful life.

It is yet a further object of the present invention to provide a method for increasing aircraft value and maximizing airline profits in connection with equipping aircraft with a cost-saving onboard wheel drive system controllable to move the aircraft during taxi and pushback without reliance on the aircraft's engines or tugs.

It is yet another object of the present invention to provide a method for increasing the profitably of the operation of new as well as older aircraft.

In accordance with the aforesaid objects, a method for increasing the effective value of aircraft is provided. When older or new aircraft are equipped with cost-saving wheel drive systems controllable to move the aircraft autonomously and enabled to move autonomously on the ground without reliance on aircraft engines or external tow vehicles, substantial reductions in aircraft operating costs can be realized, aircraft value may be increased significantly. Significant increases in value of both aging airline fleets and new aircraft may be realized by the present method. Unexpected reductions in aircraft effective economic age and increases in value can also be achieved, particularly for aircraft that experience large numbers of short flights and a large amount of taxi time.

Other objects and advantages will be apparent from the following description, claims, and drawing.

BRIEF DESCRIPTION OF THE DRAWINGS

FIG. 2b compares depreciation for a 737-800 aircraft with and without a wheel drive system in accordance with the present method;

DESCRIPTION OF THE INVENTION

Figure 1:
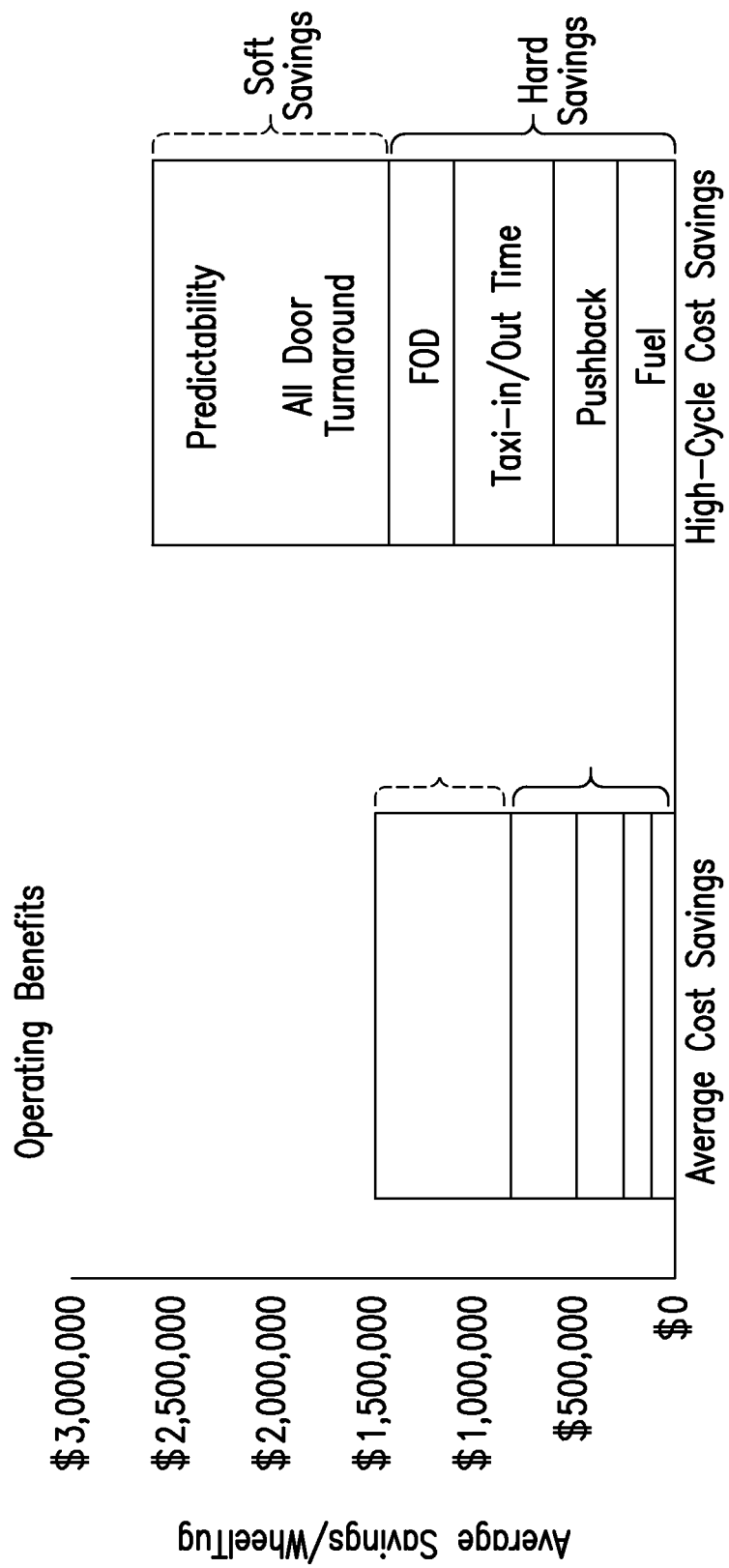
FIG. 1 illustrates airline operating benefits and compares average aircraft operating cost savings with the high cycle cost savings possible with the present method.

In the present economic climate, airlines are constantly seeking ways to reduce costs associated with profitably operating and maintaining increasingly aging fleets of aircraft while providing an acceptable level of service to the flying public. The use of wheel motors to drive aircraft autonomously on the ground without operation of the aircraft's engines has been proposed by Applicant and others. The industry has generally acknowledged the savings in fuel likely to accompany non-engine-powered aircraft ground movement. The significant impact of an aircraft's capability for autonomous ground movement without reliance on engines or external vehicles on increasing aircraft valuation, however, has only just been discovered by Applicant. When, as described herein, an aircraft is equipped with one or more onboard wheel drive systems controllable to move the aircraft autonomously on the ground between landing and takeoff, not only may substantial cost savings be realized, but economic values of new and aging aircraft may also be significantly increased. Moreover, when an onboard wheel drive system is used to the maximum benefit, the value of an older aircraft can be greater than the value of a newer aircraft.

In accordance with the present invention, an aircraft is equipped with one or more cost-saving wheel drive systems designed to drive one or more aircraft nose and/or main landing gear wheels. The wheel drive systems are controllable by a pilot or flight crew to drive the aircraft autonomously on the ground without reliance on the aircraft's main engines or external tow vehicles. A preferred aircraft drive wheel drive system may include a roller traction drive system operatively disposed between a non-engine drive means and a clutch assembly, and the system may be enclosed completely within a space created by the arrangement of the wall sections of an aircraft wheel, as described and shown in co-pending International Patent Application No. PCT/US/13/51407, filed 19 Jul. 2013, and entitled AIRCRAFT DRIVE WHEEL SYSTEM WITH ROLLER TRACTION DRIVE SYSTEM, the disclosure of which is hereby incorporated herein by reference. This preferred aircraft drive wheel system may be added to, or removed from, aircraft without taking them out of service.

A preferred wheel drive system non-engine drive means may include a rotating element, such as a rotor, and a stationary element, such as a stator. A non-engine drive means preferred for use with the aircraft drive wheel drive system in the present method is an electric motor assembly that is capable of operating at high speed and could be any one of a number of suitable designs. An exemplary drive means is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range controllable to move an aircraft wheel and, therefore, an aircraft autonomously and to function as described herein may also be suitable drive means in an aircraft wheel drive system able to achieve the benefits of the present method. A high phase order electric motor of the kind described in, for example, U.S. Pat. Nos. 6,657,334; 6,838,791; 7,116,019; and 7,469,858, the disclosures of the aforementioned patents are incorporated herein by reference, can be effectively used as a non-engine drive means. Another example of a suitable non-engine drive means is a high phase order induction motor with a top tangential speed of about 15,000 linear feet per minute and a maximum rotor speed of about 7200 rpm, although drive means capable of a wide range of such speeds could also be used. Other non-engine drive means, including hydraulic and/or pneumatic drive means, are also contemplated to be within the scope of the present invention. Power for an electric non-engine drive means is preferably supplied by an aircraft's auxiliary power unit (APU), although other suitable sources of power may also be used.

A drive system suitable for driving one of the drive means described above may be the preferred roller traction drive system, which more efficiently performs functions that would be performed by gearing or a gear system. Alternatively, the drive system could be a gear system, an arrangement of gearing, or another equivalent type of drive system. The replacement of gearing by a roller traction drive system in an aircraft drive wheel drive system presents many advantages. A roller traction drive system designed to actuate a drive means capable of moving a commercial sized aircraft on the ground not only has a low profile and is light weight, but also provides the high torque and high speed change ratio required to optimally operate the drive means to move an aircraft on the ground. A clutch assembly is preferably provided that can be activated automatically or manually to engage and disengage the roller traction drive or other drive system into and out of actuation with the non-engine drive means so that the drive means is actuated to move an aircraft wheel to drive the aircraft on the ground. When appropriate, the drive means is de-actuated so that the drive means is unable to drive the aircraft wheel. The roller traction drive system should only be engaged by the clutch assembly to actuate the drive means when the aircraft is actually on the ground, such as after landing and prior to takeoff, and when the aircraft is traveling at a desired speed during ground travel. The clutch assembly could also be replaced by an equivalently functional structure.

When an aircraft equipped with a wheel drive system lands at an airport, aerodrome, or airfield, the aircraft pilot or another flight crew member shuts off the aircraft's main engines and controls activation of the wheel drive system to actuate the drive means to move the aircraft autonomously from its landing location to a parking destination, typically at a gate or other airport ramp location. At departure, the pilot also controls the wheel drive system during pushback to move the aircraft in reverse from a gate or other parking location and then forward out of the ramp area to a takeoff runway. The pilot or flight crew controls ground movement of the aircraft by directly controlling operation of the aircraft wheel drive system. An aircraft's capability for pilot or cockpit crew-controlled autonomous movement has been found to have benefits for aircraft and airlines far beyond simply the capability for independent, autonomous movement.

The value the aforementioned wheel drive system adds to an aircraft can be derived from a reported ratio of lease returns to book value for a newly acquired airline fleet of aircraft. Based on currently available information, a cost savings to total value ratio of about 12.5 can be realized, and about US$10 million could be added to the value of an aircraft, based on the annual savings possible. The value can be increased further if an airline implements such procedures as using four doors for disembarking and boarding passengers and counting emissions credits. Airlines can potentially realize operating cost reductions in the range of about US$785,000 to about US$2,500,000 when aircraft are equipped with wheel drive systems as described above so that the aircraft can operate on the ground without engines or tugs. It should be noted that the foregoing figures and amounts, as well as those discussed below, are based on the best currently available information and, depending upon actual situations, these numbers could vary from what is presented herein.

FIG. 1 presents operating benefits resulting from an annual savings analysis from two perspectives: average cost savings and cost savings for high cycle aircraft, including those that fly frequent, low-range trips from larger airports. The two categories of savings considered include hard savings, such as fuel costs, pushback costs, taxi-in and taxi-out time, and foreign object debris or foreign object damage (FOD) costs, and soft savings, such as costs due to the use of all aircraft doors during turnaround, and predictability. The more flights an aircraft completes each day, the greater the possible savings. It is estimated that soft savings in the categories listed in Table 1 below can be achieved in the ranges presented, depending on whether an aircraft is considered to operate as a low turnaround aircraft, with a relatively low number of turnarounds or cycles (4.5 cycles/day) or a high turnaround aircraft, with almost twice the number of turnarounds or cycles (8 cycles/day).

TABLE 1

| Soft Savings Category | Low Turnaround (4.5 cycles/day) Annual Savings | High Turnaround (8 cycles/day) Annual Savings |
|---|---|---|
| All Aircraft Doors Used for Turnaround* | US$800K | US$1.4M |
| Predictability** | US$199K | US$350K |

*Assumes a reduction of 290 seconds above a baseline 145 seconds for taxi in and out without engines
**Based on increase from 4.5 to 8 turnarounds per day The foregoing predictability savings and predictability benefits are additionally premised on avoiding tug delays that may account for 15 minutes every 15 cycles, an average passenger count of about 115 passengers, US$1.07/passenger/minute reduced future revenue, and assumes one minute of unexpected delay removed from each flight. The use of all available doors, usually two in the fore section and two in the aft section of an aircraft, for passenger loading and unloading can produce significant savings. Cost savings, although at a lower level, will also be realized when more than the single door currently used for passenger entry and exit is used. The substantial hard savings that accompany equipping an aircraft with a pilot-controllable wheel drive system that are shown and discussed in connection with FIG. 1 are possible because engine operation during ground maneuvering is not required. Consequently, fuel, pushback, and FOD costs and turnaround time are significantly reduced, delays are minimized, and airline pricing power is increased. The present method additionally produces savings in other areas, such as, for example, reduced engine blade and brake wear, emissions credits, and flight weight reduction.

Figure 2A:
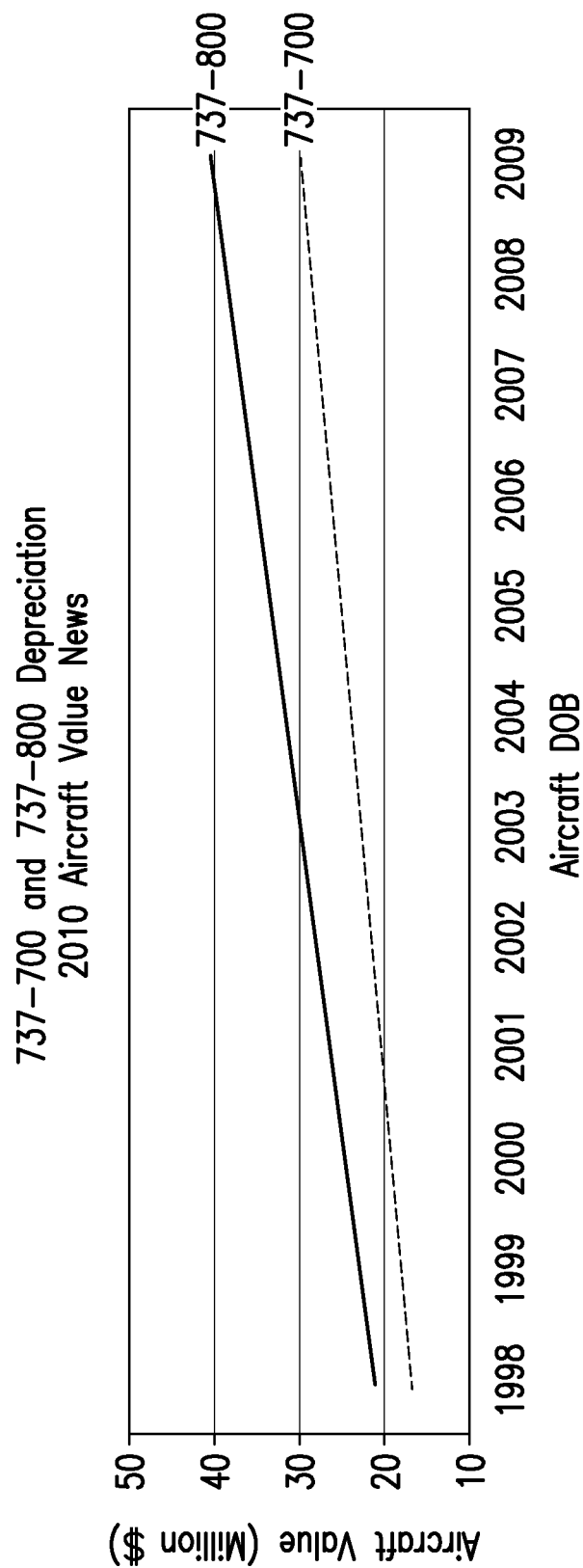
FIG. 2a shows a comparison of depreciation for a 737-700 aircraft and a 737-800 aircraft based on 2010 information.

FIGS. 2a and 2b compare depreciation as a measure of aircraft value, respectively, for aircraft not equipped with a wheel drive system and for aircraft equipped with a cost-saving wheel drive system as described herein. FIG. 2a shows the depreciation for a Boeing 737-700 aircraft and a Boeing 737-800 aircraft over about a 10 year period. Neither of these aircraft was equipped with a cost-saving or other wheel drive systems. Depreciation is relatively steady, with an 11 year old 737-800 worth about 53% of the value of the aircraft when new and an 11 year old 737-700 worth about 55% of the value of a new 737-700, representing a loss in value of about 4.1% per year. This amounts to a depreciation of about US$1.7 million per year for the 737-800.

FIG. 2b compares depreciation over the same period for the 737-800 aircraft that is not equipped with a wheel drive system, shown in FIG. 2a, and two examples of 737-800 aircraft that are equipped with cost-saving wheel drive systems according to the present invention. One of the FIG. 2b wheel drive system-equipped aircraft examples illustrates a potential higher range of savings, and the other aircraft example represents a potential lower range of savings possible when a 737-800 aircraft is equipped with a cost-saving wheel drive system. A preferred cost-saving wheel drive system is available under the name of WheelTug®, which appears in the title of the FIG. 2b graph. When the savings described above are considered, it is estimated that equipping a 737-800 aircraft with a WheelTug® wheel drive system can increase the value of the aircraft by about US$10 million. This value can be increased even more, if an airline takes into account the soft savings shown and discussed in connection with Table 1 above, to an estimated value of about US$35 million. At the higher end of savings, FIG. 2b shows that a 10 year old 737-800 equipped with a cost-saving wheel drive system, such as a WheelTug®, is worth more than an almost new aircraft. This is also discussed below in connection with FIG. 4.

As noted above, a "hard charging" airline, such as, for example, a carrier that operates aircraft with a high number of turnarounds or cycles or with low range, frequent trips from larger airports, has the potential to increase the value of its aircraft even more, potentially in the range of about US$18 to 20 million. This increase in value effectively extends the economic life of an aircraft by about 3 to 10 years, so that the aircraft is effectively 3 to 10 years younger than it would be otherwise. For an airline that operates aircraft with favorable taxi profiles, including large amounts of taxi time and large numbers of short flights, a 15 year old aircraft equipped with a wheel drive system will be worth more than a 5 year old aircraft that is not equipped with a cost-saving wheel drive system.

Figure 3:
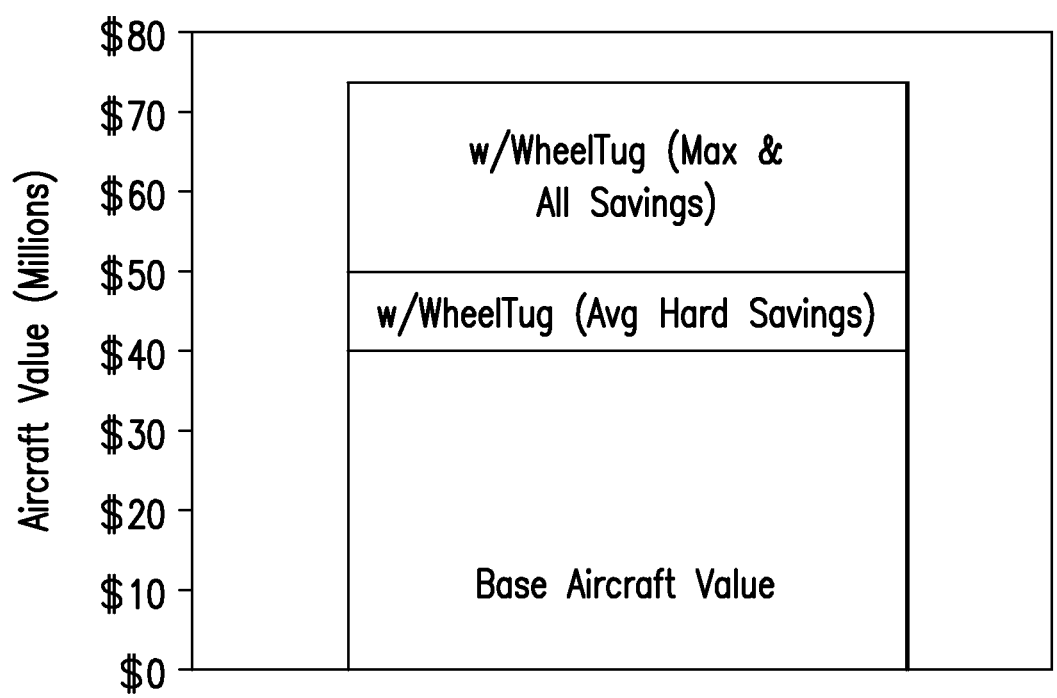
FIG. 3 illustrates the enhancement of the value of new aircraft possible with the present method.

While cost-saving wheel drive systems used in the present method of increasing aircraft value are most likely to be retrofitted on existing or older aircraft to increase their value, FIG. 3 illustrates that equipping new aircraft with cost-saving wheel drive systems can also positively impact the value of new aircraft. If, as shown in FIG. 3, the base value of a new aircraft is about US$40 million, the average hard savings, including, for example, fuel, pushback, taxi-in and taxi-out time, and FOD, achieved by equipping the new aircraft with a cost-saving wheel drive system adds another about US$10 million to the aircraft's value. When the maximum possible savings of equipping a new aircraft with a cost-saving wheel drive system are considered, the US$40 million value of the new aircraft can be increased to over about US$70 million.

Figure 4:
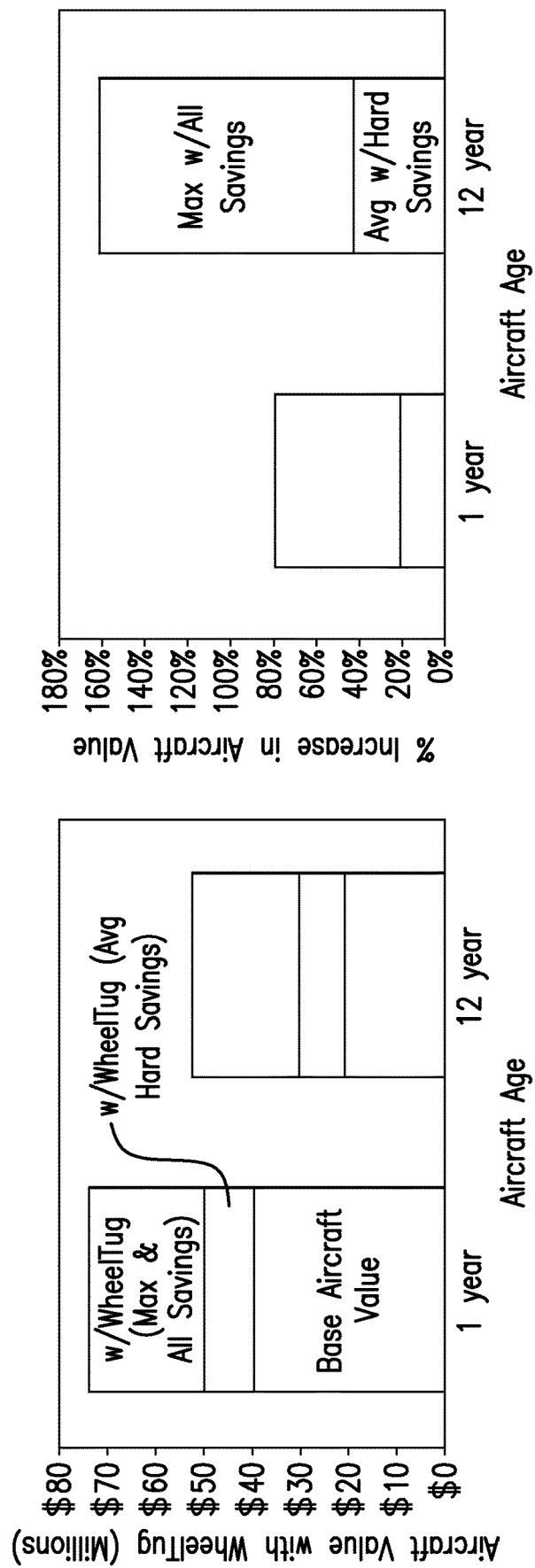
FIG. 4 compares the impact of the present method on young and aging aircraft.

FIG. 4 compares the relative values of a one year old aircraft and a 12 year old aircraft equipped with wheel drive systems and the percentage increase in value possible when all of the savings achieved by operating aircraft with wheel drive systems are factored in. As noted above, when a wheel drive system on an aircraft is used to maximum benefit, equipping a12 year old aircraft with a wheel drive system can make the older aircraft more valuable than a new one. FIG. 4 shows that a one year old aircraft equipped with a cost-saving wheel drive system has a value of over about US$70 million, and that a 12 year old aircraft equipped with a cost-saving wheel drive system has a value of about US$55 million, which is not significantly lower. The percentage increase in aircraft value for these one and 12 year old aircraft as a result of installing and using a cost-saving wheel drive system for autonomous aircraft ground movement is over about 80% for the newer aircraft, but about 160% for the older aircraft. It is abundantly clear that equipping an aircraft with a cost-saving wheel drive system and realizing the potential savings significantly increases the effective value of both old and new aircraft.

The present method makes possible the extension of an aircraft's economic life when the aircraft is equipped with a cost-saving wheel drive system to move the aircraft autonomously on the ground without reliance on use of the aircraft's main engines or external tow vehicles. There is typically a point in the life of most aircraft when the value of the entire aircraft is worth less than its parts, and extending the aircraft's useful economic life may not be feasible. Equipping aircraft on the verge of retirement with cost-saving wheel drive systems, however, can still multiply the value of these aircraft in their final years of operation. Equipping a number of these older, end-of-life aircraft in an airline's fleet with cost-saving wheel drive systems on a rotating basis can also add value to the aircraft collectively and achieve extension of value levels approaching those discussed above.

The present method and the increase in value and savings achieved can also be leveraged to produce a predictably high return on investment. In this approach, a buyer could buy a large number of slots and then undertake the investment required to equip older aircraft with cost-saving wheel drive systems as described above. Sales or leases of the wheel drive system-equipped, now significantly more valuable, aircraft could yield substantial returns on such an investment in view of the savings achievable with the present method.

The method for increasing aircraft value and extending aircraft effective value and economic life described herein has been described with respect to preferred embodiments. Other, equivalent, processes and structures are also contemplated to be within the scope of the present invention.

INDUSTRIAL APPLICABILITY

The method of the present invention has wide applicability in increasing aircraft value and in extending aircraft value and economic life. When used to maximum benefit, the present method, wherein older aircraft are equipped with cost-saving wheel drive systems, can significantly increase and extend the value of these older aircraft beyond that of a new aircraft not equipped with a wheel drive system as described herein. The cost savings in aircraft fleet operations produced by the present method are additionally significant.

The invention claimed is:

1. A method for increasing a base economic value to an airline and extending useful economic operating life of high turnaround aircraft in the airline's fleet of aircraft, comprising:
   a. identifying high turnaround aircraft in the airline's fleet of aircraft operating at least 8 cycles per day with high turnaround taxi profiles having a base economic value to be increased and a useful economic operating life to be extended;
   b. equipping a number of high turnaround aircraft for autonomous ground movement by mounting completely within wheel walls of one or more nose or main landing gear wheels pilot-controllable landing gear wheel drive systems comprising an electric motor assembly, a roller traction actuation system, and a clutch assembly activatable to engage and disengage the roller traction actuation system into and out of actuation with the electric drive motor assembly;
   c. driving the equipped high turnaround aircraft according to the high turnaround taxi profiles with only the pilot-controllable landing gear wheel drive systems and without operating aircraft engines and tow vehicles during taxi-in, taxi-out, and pushback as the equipped high turnaround aircraft are operated during the at least 8 cycles per day;
   d. using all fore section and all aft section doors on the equipped high turnaround aircraft to unload and load passengers during the at least 8 cycles per day; and
   e. generating annual savings in hard aircraft operating costs comprising fuel costs, pushback costs, taxi-in and taxi-out time, and foreign object debris costs and soft aircraft operating costs comprising use of all aircraft doors during turnaround and predictability as the equipped high turnaround aircraft continue to be driven autonomously during taxi with the pilot-controllable landing gear wheel drive systems for the at least 8 cycles per day to increase the base economic value and extend the useful economic operating life of the equipped high turnaround aircraft, further comprising equipping the number of the identified high turnaround aircraft in the airline's fleet of aircraft for autonomous ground movement with the pilot-controllable landing gear wheel drive systems on a rotating basis, driving the number of equipped high turnaround aircraft with the pilot-controllable landing gear wheel drive systems when the number of equipped high turnaround aircraft are operated during the at least 8 cycles per day, and collectively extending the useful economic operating life of the number of equipped high turnaround aircraft as the number of equipped aircraft continue to be driven autonomously with the pilot-controllable landing gear wheel drive systems during the at least 8 cycles per day.

2. The method of claim 1, further comprising continuing to drive the equipped identified high turnaround aircraft with the pilot-controllable landing gear wheel drive systems according to the high turnaround taxi profiles for the at least 8 cycles per day, and extending the useful economic operating life of the equipped high turnaround aircraft by about 3 to 10 years.

3. The method of claim 1, further comprising, equipping high turnaround new aircraft in the airline's fleet with the pilot-controllable landing gear wheel drive systems, driving the equipped high turnaround new aircraft during taxi with the pilot-controllable landing gear wheel drive systems according to the high turnaround taxi profiles for the at least 8 cycles per day, and producing a greater increase in the base economic value of the equipped high turnaround new aircraft compared with a base economic value of a new aircraft not equipped for autonomous ground movement with the pilot-controllable landing gear wheel drive systems.

4. The method of claim 1, further comprising wherein the equipped high turnaround aircraft in the airline's fleet of aircraft are at least 12 years old, continuing to drive the at least 12 year old equipped high turnaround aircraft, and collectively extending the useful economic operating life of the at least 12 year old equipped high turnaround aircraft as the at least 12 year old equipped high turnaround aircraft continue to be driven with the pilot-controllable landing gear wheel drive systems.

5. The method of claim 1, further comprising a number of the high turnaround aircraft having two doors in a fore section of the aircraft and two doors in an aft section of the aircraft and continuing to drive the number of high turnaround aircraft during taxi with the landing gear wheel-mounted drive systems according to the high turnaround taxi profiles for the at least 8 cycles per day, and generating the annual savings in soft aircraft operating costs from using the two fore section aircraft doors and the two aft section aircraft doors for passenger unloading and loading during turnaround and predictability as the high turnaround aircraft are driven with the landing gear wheel-mounted drive systems according to the high turnaround taxi profiles compared to aircraft not equipped with the pilot-controllable landing gear wheel-mounted drive systems or aircraft not driven according to the high turnaround taxi profiles.

6. The method of claim 5, further comprising, on a rotating basis, mounting pilot-controllable landing gear wheel drive systems comprising an electric drive motor assembly, a roller traction drive system disposed between the electric drive motor assembly and a clutch assembly completely within a space created by an arrangement of wheel wall sections in each nose landing gear wheel of the number of the high turnaround aircraft having two doors in a fore section of the aircraft and two doors in an aft section of the aircraft in the airline's fleet of aircraft operating at least 8 cycles per day with high turnaround taxi profiles, driving the number of high turnaround aircraft according to the high turnaround taxi profiles with only the nose landing gear wheel-mounted drive systems, and unloading and loading passengers through the two fore section doors and the two aft section doors on the number of high turnaround aircraft during the at least 8 cycles per day.

* * * * *